United States Patent [19]
Sallberg

[11] Patent Number: 6,073,018
[45] Date of Patent: Jun. 6, 2000

[54] SYSTEM AND METHOD FOR INTERWORKING OF WIRELESS COMMUNICATION SYSTEMS WITH ISDN NETWORKS

[75] Inventor: Krister Sallberg, Lund, Sweden

[73] Assignee: Ericsson Inc, Research Triangle Park, N.C.

[21] Appl. No.: 08/988,978

[22] Filed: Dec. 11, 1997

[51] Int. Cl.[7] .............................. H04Q 7/20; H04Q 7/00
[52] U.S. Cl. .......................... 455/435; 455/450; 370/329
[58] Field of Search .................................. 370/328, 329, 370/338, 401; 455/450, 452, 552, 553, 560, 435

[56] References Cited

U.S. PATENT DOCUMENTS

| | | | |
|---|---|---|---|
| 5,289,536 | 2/1994 | Hokari | 379/221 |
| 5,396,543 | 3/1995 | Beeson, Jr. et al. | 455/560 |

FOREIGN PATENT DOCUMENTS

| | | |
|---|---|---|
| 2 243 973 | 11/1991 | United Kingdom . |
| WO95/26094 | 9/1995 | WIPO . |
| WO96/35300 | 11/1996 | WIPO . |

OTHER PUBLICATIONS

ETSI Secretariat, *Digital Cellular Telecommunications System, Global System for Mobile Communications (GSM)*, Draft: Dec. 1996; pp. 1–58.

*Primary Examiner*—William G. Trost
*Assistant Examiner*—Raymond B. Persino
*Attorney, Agent, or Firm*—Jenkens & Gilchrist

[57] ABSTRACT

A wireless communications system, such as a GSM/PCS 1900 wireless communications system, is connected to a digital network, such as the integrated services digital network (ISDN) through one or more trunks. The trunks have one or more information transfer capabilities, such as unrestricted 64 kbps data transfer rate typical in European markets or restricted data transfer rates of less than 64 kbps which can be found in North American markets. Terminal equipment, such as mobile stations, in the wireless communications system requests either restricted digital information (RDI) services or unrestricted digital information services (UDI). An interworking function unit (IWF) in a Mobile service center (MSSC) of the wireless communications system determines the transfer capability of the one or more available trunks, and maps signaling messages between the wireless communication system and the digital network in response to the transfer capability of the one or more available trunks and in response to whether an RDI or a UDI service is requested by the terminal equipment.

17 Claims, 4 Drawing Sheets

SYSTEM AND METHOD FOR INTERWORKING OF WIRELESS COMMUNICATION SYSTEMS WITH ISDN NETWORKS

BACKGROUND OF THE INVENTION

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue in the coming decades as well, as this wireless network interacts with and eventually overtakes the existing wireline networks.

Figure 1:
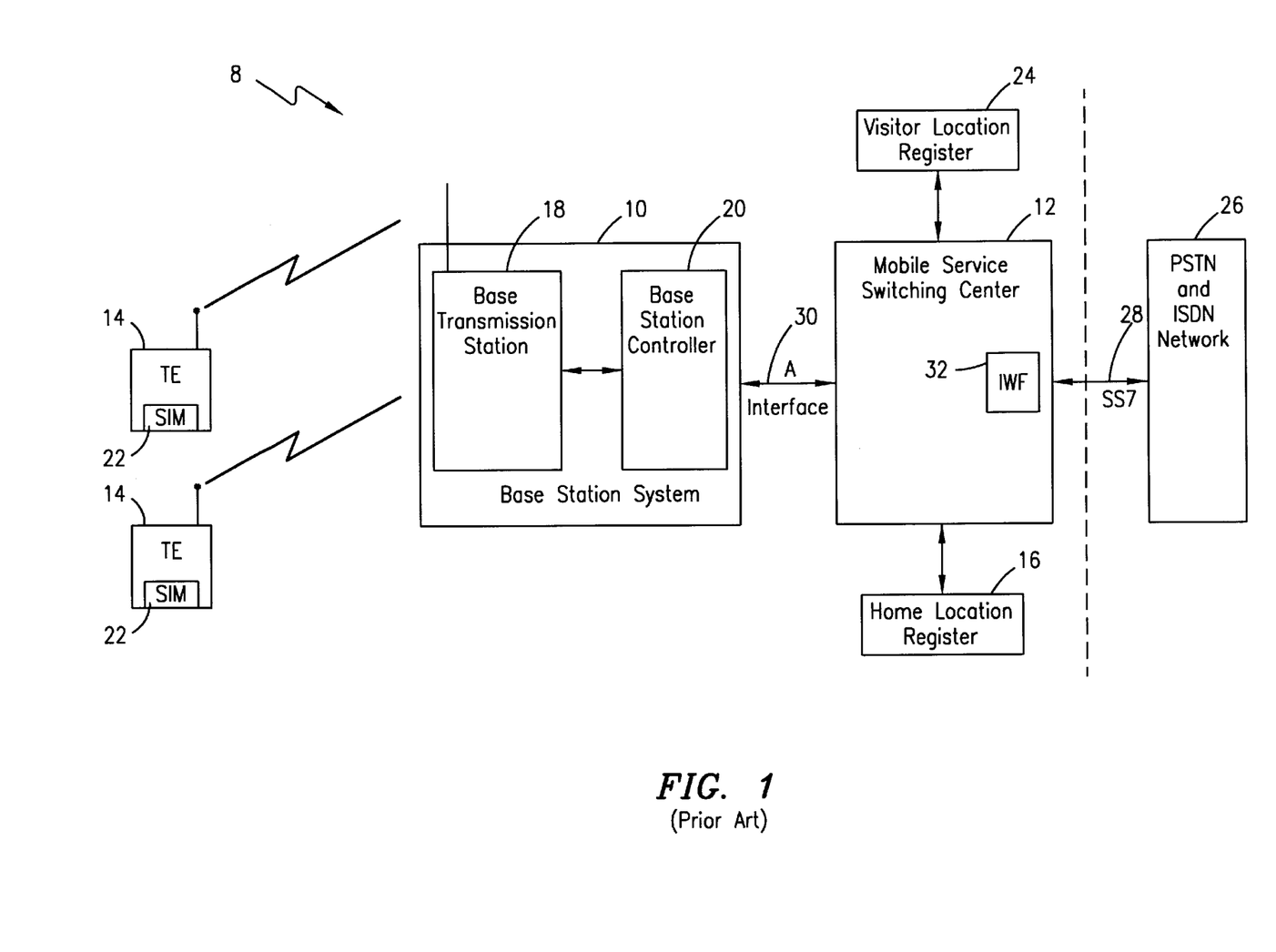
FIG. 1 illustrates a wireless communications system within which the present invention may be incorporated.

In 1982, the Groupe Special Mobile (GSM) committee took the initiative of developing standards for a European cellular telephony system in a 900 MHZ band. The resulting standard was named GSM, after its developers. A first level of GSM specifications was approved by the European Telecommunications Standards Institute (ETSI) in 1990 and a second level of recommendations was issued at the end of 1993. In the ensuing years, the GSM standard has been implemented in more than thirty-six networks in over twenty countries. The GSM standard continues to evolve and has recently been revised to operate in a newly reserved frequency band in the 1800 range in Europe and in the 1900 range in North America. The revised GSM standard is also known as Personal Communication Services 1900 or PCS 1900. FIG. 1 illustrates the typical components of a GSM wireless communications system 8.

The GSM wireless communications system 8 is located within a geographical area serviced by a single provider called the public land mobile network (PLMN). The basic components of the wireless communications system 8 are a base station system 10, a mobile service switching center (MSSC) 12 and terminal equipment (TE) 14. At least one base station system 10 is deployed within the PLMN. The base station system 10 acts as an interface between the MSSC 12 and the terminal equipment 14. The terminal equipment 14 may be mobile wireless telephones, pagers or other equipment. The terminal equipment 14 in GSM includes a subscriber identification module or SIM card 22 which is plugged into the terminal equipment 14. The SIM card 22 allows the subscriber to access the network through any terminal equipment 14 in which the subscriber has inserted their SIM card 22. The SIM card 22 includes such data as a unique subscriber identity and encryption keys, telephone number, list of preferences in networking, charging information and other data.

The base station system 10 includes a base transmission station 18 and base station controller 20. The base transmission station 18 operates as a transceiver for transmitting and receiving data and control messages to and from the terminal equipment 14 over the air interface. The air interface includes both traffic and control channels. The traffic channels transmit voice or data at various rates. A full rate traffic channel allows the transmission of speech coded at 13 kbits/s or asynchronous and synchronous data at various user transmission rates, up to 14.4 kbits/s. The control channels are used to control call processes and provide information. Various control channels include, inter alia, a broadcast control channel (BCCH) that periodically transmits base station identification and parameters, a paging channel (PCH) to call a terminal to initiate a call process, and a standalone dedicated control channel (SDCCH) to exchange information before a traffic connection, and a random access channel (RACH) for a request from the terminal to initiate an exchange of information. The control channels and traffic channels may be mapped into the allowed frequency band in various ways.

The base station system 10 is connected to the MSSC 12 through dedicated telephone lines at an A interface 30. Also connected to the MSSC 12 is a visitor location register (VLR) 24 and a home location register (HLR) 16. The VLR 24 is a database used to store data for any terminal equipment 14 which has registered within the service area of the particular MSSC 12 and though shown as a separate node is often implemented within the same node or server as the MSSC 12. The HLR 16 is a database which stores subscriber information for all subscribers to that PLMN. An interworking function unit (IWF) 32 in the MSSC 12 links the wireless communications system 8 to the public switched telephone network (PSTN) 26 via a trunk 28. Alternatively, the PSTN network 26 may be an integrated services digital network (ISDN). The functions related to switching and networking are generally controlled by equipment located above the A interface 30. Thus, the MSSC 12 and IWF 32 control the switching of incoming calls to various base station systems 10 and the interfacing of outgoing calls to the PSTN or ISDN network 26.

The wireless communications system 8 provides wireless telephony services as well as bearer services and other services available through the PSTN network 26. The concept of an ISDN was first formulated by a division of the International Telegraph Union (ITU) called the International Consultative Committee for Telephone and Telegraph (CCITT). ISDN was meant to provide user access to the integrated digital network (IDN) of digitized switching and transmission. CCITT has provided extensive coverage of the ISDN network 26 in various series of standards, including G (Transmission), Q(Switching and Signaling), and the V series. In Europe, the ITU standard V.110 is commonly used to communicate between two computers. ITU V.110 protocol is used end-to-end between the two computers and is part of a terminal adapter unit connected to the computer, in the same manner as a modem. The terminal adapter (TA) provides bit rate adaption and end-to-end synchronization. The GSM system uses a modified ITU standard across the air interface. The modified GSM system's version of the ISDN service is designated V.110'.

The basic bearer services offered in the European market of the ITU V.110 are based on data channels having an unrestricted bearer services of 64 kbps data rate. The trunks 28 between an ISDN network 26 and a wireless communications network 8 are typically operating at unrestricted data rates of 64 kbps in the European market.

In North America, the corresponding ISDN services are typically based on a somewhat similar ITU standard designated V.120. Due to different recommendations promulgated by the American National Standards Institute (ANSI), some trunks 28 in the United States may provide data rates of 56 kbps with 8 kbps of the channel reserved for control signaling. This is called channel associated signaling (CAS). Also, an intermediate case is in use where signaling is carried out of band but a High-Level Data Link Control (HDLC) inverted mode is used to keep synchronization.

These two modes are commonly called restricted 64 kBit/s transfer capability because less than 64 kBits/s of data are transferred. Thus, the physical links 28 in the United States may comprise both restricted digital information (RDI) of less than 64 kbits/s and unrestricted digital information (UDI) equal to 64 kbits/s.

Currently, ETSI is studying having access to ISDN services in Europe and North America and on compatibility with CCITT recommendations. ETSI is standardizing interworking between the GSM V.110' and ITU standard V.120 for European PLMN operators, i.e., wherein a European PLMN operator is transmitting or receiving ISDN messages to and from the United States. These recommendations are reported in ETSI Publication GSM 09.07, entitled, "Digital cellular telecommunications system (Phase 2+); General requirements on interworking between the Public Land Mobil Network (PLMN) and the Integrated Services Digital Network (ISDN) or Public Switched Telephone Network," (December 1996).

However, ETSI has provided no guidance or technical documentation describing the interworking between a GSM system operating with ISDN services under the GSM V.110' standard and an ISDN system operating under the ITU standard V.120 when the PLMN operator is operating a GSM system in North America or other markets where data rates other than the unrestricted transfer capability of 64 kbps is provided in the physical trunks. For example, the ETSI publication GSM 09.07 assumes that the ISDN network connected to the wireless communications network 8 provides a 64 kbps data link.

Additional guidance is needed in this area due to the differences in the physical link data rates between North America and Europe. Thus, a need has arisen for a system and method to govern the interworking of a GSM wireless communications system with an ITU V.120 standard ISDN network which is operating under the ANSI standards of physical links with restricted data rates of less than 64 kbits/s.

Similarly, there is no documentation describing interworking between the two ITU standards V.110 and V.120. Thus, a need has also arisen for a system and method to govern the interworking between an ISDN network operating in accordance with ITU V.110 and another ISDN network operating in accordance with ITU V.120.

It is, therefore, an object of the present invention to provide a system and method for such interworking between diverse transfer capability networks.

SUMMARY OF THE INVENTION

The present invention is directed to a wireless communications system connected to a digital network through one or more trunks having a first transfer capability and a second transfer capability. The wireless communications system includes a message center for receiving a call set-up message that includes a request for a call connection having the first or second transfer capability; and an interface unit that determines the availability of the plurality of trunks having the first and second transfer capability and maps messages between the wireless communication system and the digital network in response to the availability of the trunks having the first and second transfer capability and the request for the call connection in the call request message.

The terminal equipment, such as a mobile station, transmits the call set-up message that includes a request for a call connection having the first or second transfer capability. Typically, the first transfer capability is unrestricted transfer capability and the second transfer capability is restricted transfer capability. The interface unit maps the call set-up message to a first coding alternative in response to determining that an available trunk has a restricted transfer capability and a request by the terminal equipment for restricted transfer capability and maps the call set-up message to a second coding alternative in response to determining that an available trunk has a restricted transfer capability and a request by the terminal equipment for unrestricted transfer capability. The interface unit may reject a request for call establishment in response to determining that the available trunks have restricted transfer capability and the request for call establishment includes a request for unrestricted transfer capability.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 2:
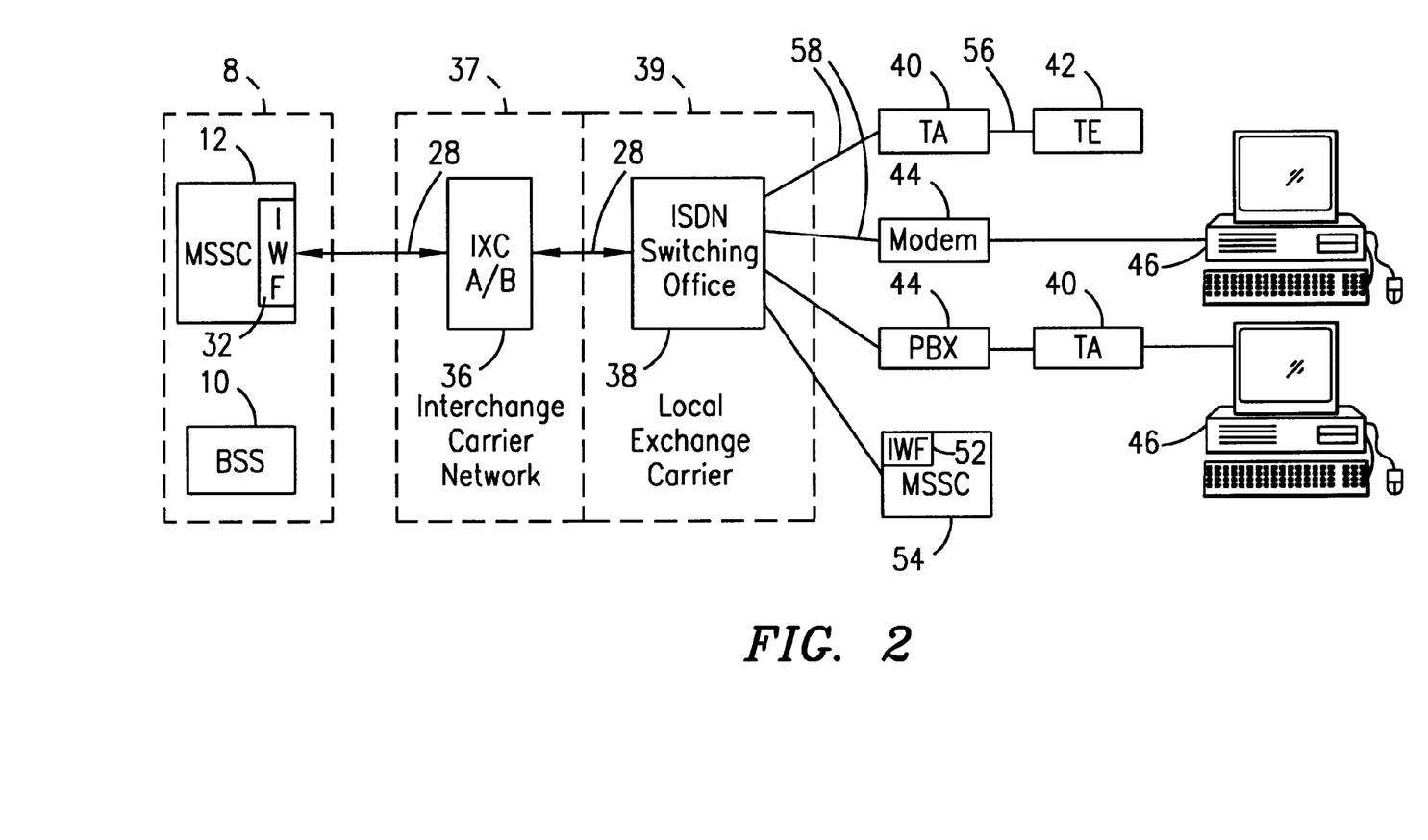
FIG. 2 illustrates the interfacing of the wireless communications system of the present invention with an ISDN network.

FIG. 2 illustrates a typical PSTN network 26 and its interface with a wireless communications network, such as the GSM system 8 shown in FIG. 1. As explained above, the PSTN network 26 may also be an ISDN network 26. Although the wireless communications network 8 in the presently preferred embodiment is a GSM system, a person skilled in the art would nonetheless appreciate that other wireless communications systems may incorporate and benefit from the principles of the present invention set forth herein.

With reference again to FIG. 2, the wireless communications system 8 acts as a local exchange carrier for the PSTN network 26. In particular, the mobile service switching center (MSSC) 12 is connected to an interexchange carrier (IXC) switch 36 in an interexchange carrier network 37 through the aforementioned physical trunks 28, which provide unrestricted data rates of 64 kbps and/or restricted data rates of less than 64 kbps, as explained hereinbefore.

The interexchange carrier network 37 switches and routes calls from the system 8 to the appropriate local exchange carrier, designated by the reference numeral 39, attached thereto via the trunk 28. It should be understood that the IXC network 37 may also switch and route calls to a number of other local exchange carriers 39 (not shown). The destination local exchange carrier (LEC) 39 has a switching office 38 therein connected to a plurality of terminal destination sites within the serviced geographical area. Each destination site generally includes a terminal adaptor 40, connecting the site to the LEC switching office 38, and terminal equipment 42 attached thereto. For example, the destination site may include a digital modem 44 and a personal computer 46, a private branch exchange (PBX) 48 connected to another terminal adaptor 40 (with a personal computer 46), or another IWF 52 in communication with another MSSC 54.

It should be understood that the physical links 56 between the terminal adapters 40 and the terminal equipment 42, attached thereto, may operate at restricted data rates of less than 64 kbps or at an unrestricted rate of 64 kbps.

The operation of interworking between the GSM RLP/V.110' protocols and the ITU V.120 protocol is shown in FIG. 2 and further illustrated with reference to FIG. 3, which illustrates various protocols of communication that a stream of data passes at the different layers of the PSTN network 26 and the wireless communications system 8. The radio technology-dependent lower layers (RTDLL) include the physical air interface and lower transmission layers. The radio interface level (air interface) includes traffic and control or signaling channels. For example, the terminal equipment 14 transmits data to the base station system 10 over the air interface on the traffic channels.

A radio technology dependent rate adaption protocol (RTDP) 62 is in this case GSM V.110'. The stream of data from the terminal equipment 14 are transmitted through the radio technology dependent lower layers 60. Radio link layer protocols (RLP) 64 provide error correction of corrupted or lost packets. Higher layer protocols, e.g., HLP 66, constitute protocols used end-to-end between the TE 14 and the TE 42, such as file transfer protocol (FTP).

The base station system (BSS) 10 receives messages from the terminal equipment 14 through radio technology-dependent lower layers 68, i.e., over the air interface, and relays the data through dedicated trunks, e.g., the A interface 30 shown in FIG. 1, using lower layer protocols (LLPs) 70. The MSSC 12/IWF 32 receives the data in GSM V.110' format encapsulated and carried in LLP 72, and converts the data to V.120 to transmit through the PSTN 26 through RTDP 74 and RLP 76. It should, therefore, be understood that an InterWorking Function (IWF) in the MSSC 12 converts the RLP 76 and RTDP protocols 74 to the ITU V.120 protocol 78.

The MSSC 12/IWF 32 is connected to the PSTN 26 switches by physical links, e.g., the trunk 28. Again, the trunk 28 may have either unrestricted 64 kbps transfer capability, i.e., a data rate of 64 kbps, or restricted 64 kbps transfer capability, i.e., a data rate less than 64 kbps. In either event the PSTN 26 relays the information through Lower Layer Protocols 84 and 86. The PSTN 26 switches route the call to the terminal adapter (TA) 40, also shown in FIG. 2, across physical links, in this example, a trunk 58. As noted with reference to the trunk 28, the transfer capability transmitted across the trunk 58 may have either restricted 64 kbps or unrestricted 64 kbps.

The terminal adaptor 40 receives the information across the trunk 58 using LLP protocols 90 and ITU V.120 protocol 92 and relays the data through an RS 232 adapter 94. In other words, the terminal adapter 40 converts the ITU V.120 protocol to another protocol, such as Electronic Industries Association RS 232 for transmission to the terminal equipment (TE) 42 using an RS 232 adapter 96 and an HLP 98.

Figure 3:
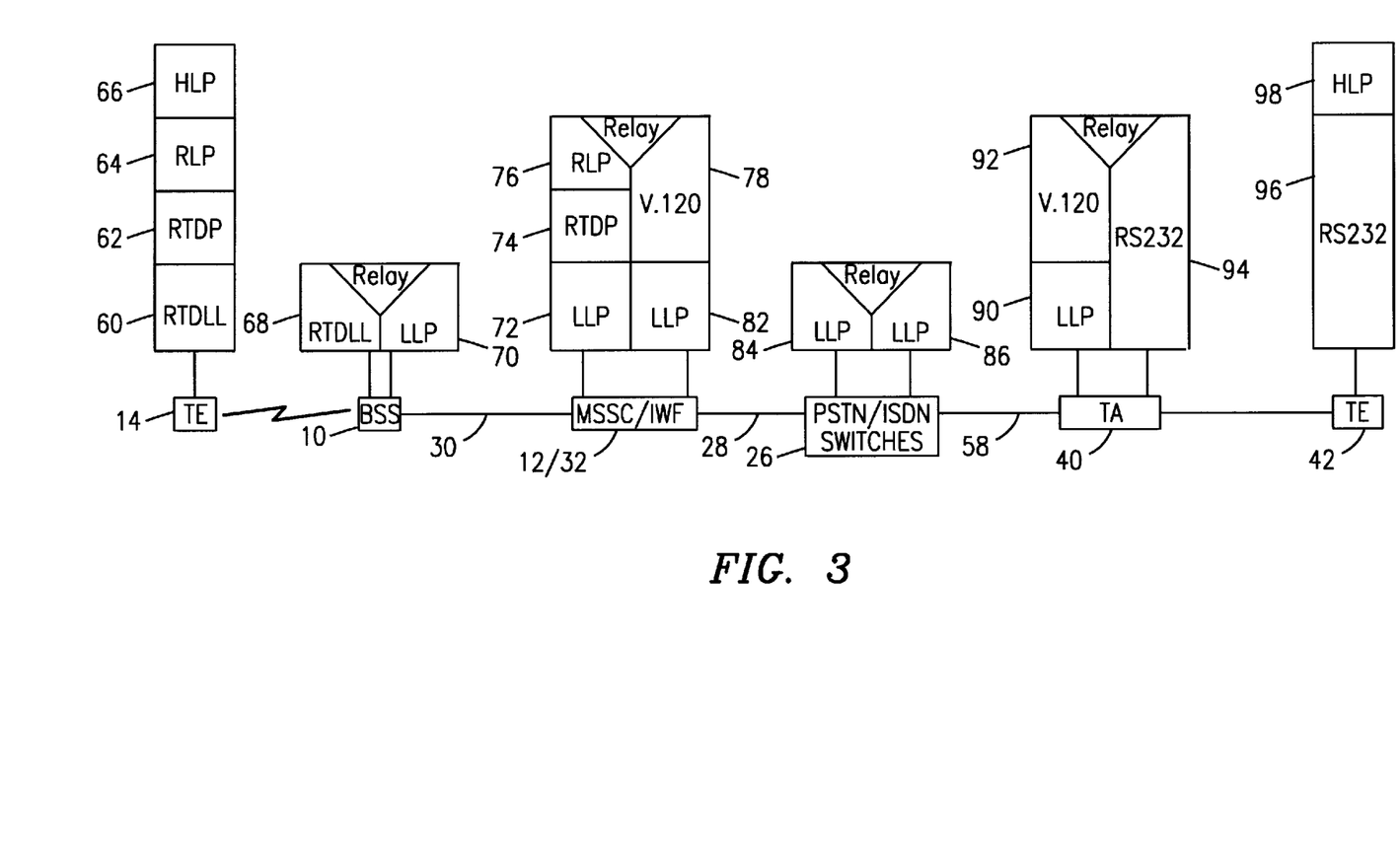
FIG. 3 illustrates a block diagram of mapping of a message through a wireless communications network and an ISDN network.

As is understood in the art, during the set-up or establishment of a call through the system illustrated in FIGS. 1, 2, and 3, the TE 14 requests the GSM and ISDN bearer services by sending a set-up message across the well-known signaling channels in the GSM system and in the Signaling System No. 7 (SS7) network of the PSTN or ISDN network.

With reference again to FIG. 3, when the terminal equipment 14 transmits a request for Unrestricted Digital Information (UDI) ISDN services through the system illustrated in FIG. 3, the system can only support unrestricted digital information (UDI) services when the system can transmit at 64 kbps along the trunks 30, 28 and 58, i.e. all trunks support unrestricted 64 kbps transfer capability. If on the other hand one (or more) of the aforementioned trunks on the route provide a restricted 64 kbps transfer capability, i.e., less than 64 kbps, only Restricted Digital Information Service can be provided.

Figure 4:
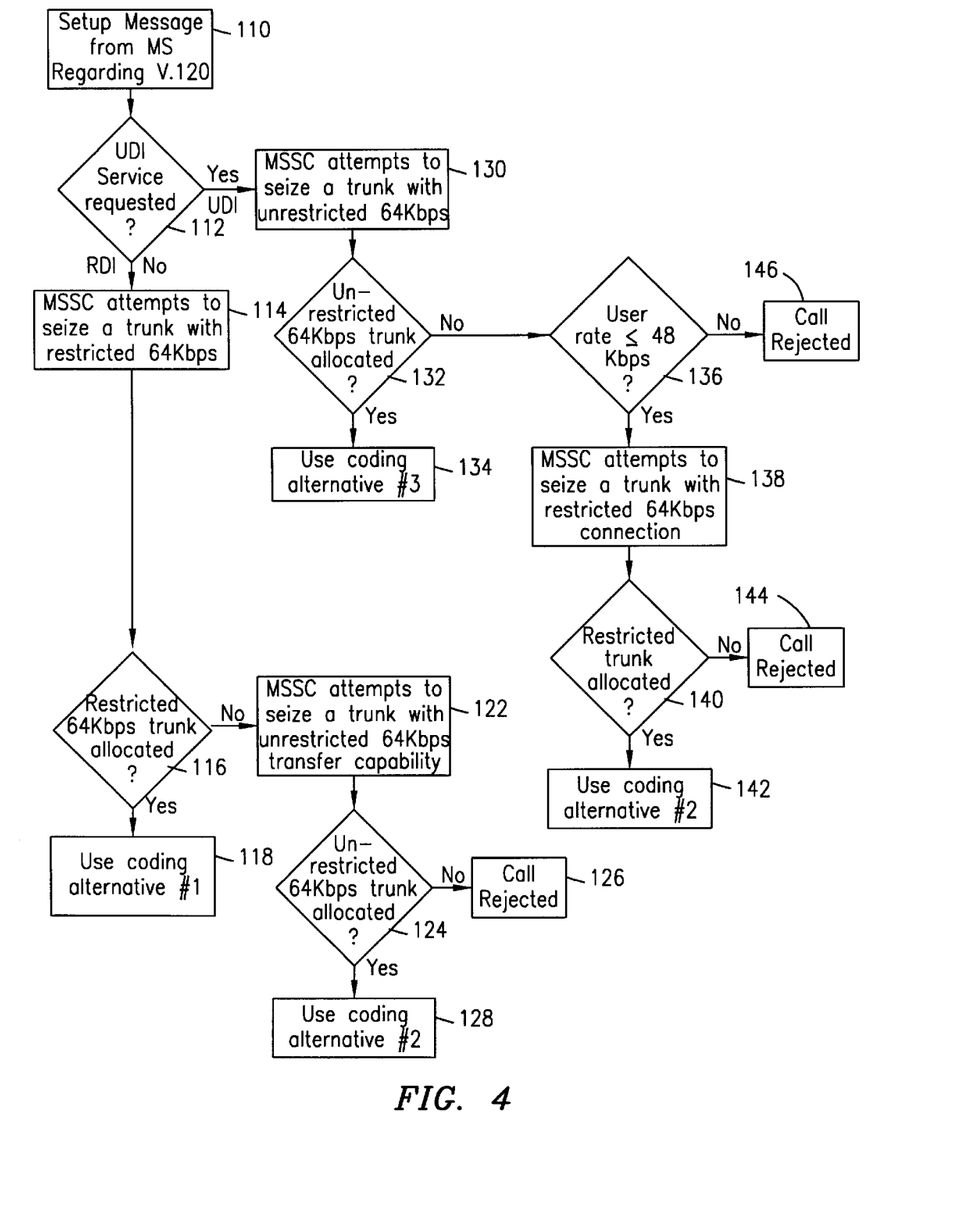
FIG. 4 illustrates a flow chart of the operation of the wireless communication system of the present invention during a call origination.

For calls originating from terminal equipment 14, e.g., a mobile station, the present invention maps a request for ISDN services from the terminal equipment 14 to the PSTN 26, such that the probability of a successful connection is increased. In particular, a process for a call request according to the present invention is shown in FIG. 4. The terminal equipment 14 first requests bearer services in a call set-up message to the mobile service switching center, as shown in step 110. In the call set-up message, the terminal equipment 14 may indicate that interworking with ITU V. 120 is requested and indicate a preference of interworking with either Restricted Digital Information (RDI) (i.e., less than 64 kbps data link) or Unrestricted Digital Information (UDI) (i.e., a 64 kbps data link) transfer capability, as shown in step 112.

Thus, the terminal equipment 14 controls whether UDI or RDI transfer capability is requested in the PSTN network 26. It should be understood that if the trunks 28 connected to the Mobile service switching center 12 only have RDI transfer capability, then the terminal equipment 14 is preferably programmed to initially request RDI transfer capability. Otherwise, the terminal equipment 14 preferably defaults to initially requesting UDI transfer capability.

Relevant information element fields in the call set-up message from the terminal equipment 14 are shown in Table 1 below.

TABLE 1

Information Element Fields in a Request for ISDN V.120 services

| Octet | Information Element Field | Field Value |
| --- | --- | --- |
| 3 | Coding Standard | GSM standard coding |
|  | Transfer Mode | circuit mode |
|  | Information Transfer Capability | UDI/Other ITC |
| 5 | Rate Adaption | other rate adaption |
| 6 | Synchronous/asynchronous | *Set according to user protocol |
| 6a | User Rate | *Set according to user protocol |
| 6c | Connection Element | nontransparent |
| 6d | Other Rate Adaption | ITU V.120 |
|  | Other ITC | not used/RDI |
| 6d | Header/No Header Multi-frame Support Mode of Operation Number of Stop Bits Negotiation Number of Data Bits | |

As shown above, the terminal equipment 14 may request either UDI transfer capability or RDI transfer capability in the information field element labeled "information transfer capability" in octet 3 and in octet 6*d*. By specifying UDI in octet 3, the terminal equipment 14 requests UDI service. The terminal equipment 14 requests RDI service by specifying "Other ITC" in octet 3 and RDI in the information field "Other ITC" in octet 6*d*.

As discussed hereinabove, the mobile service switching center 12 determines whether UDI or RDI transfer capability is requested in step 112, and then attempts to capture a corresponding trunk 28, described further herein. As explained previously, the trunk 28 may provide either unrestricted transfer capability or restricted transfer capability. Typically, the trunk 28 will include a pool of trunks with unrestricted transfer capability and a pool of trunks with restricted transfer capability. During configuration of the MSSC 12 and IWF unit 32 when the equipment is installed, the capabilities of the trunks 28 are stored in the system. In operation, the MSSC 12 tracks which trunks are unavailable and can determine from the configuration information, if the available trunks have UDI or RDI capability. For example, the configuration information may specify that trunks 1 through 5 have UDI capability and trunks 6 through 8 have RDI capability. In operation, the IWF 32 tracks which trunks are being used, for example trunks 2 through 7 may be in use. The IWF 32 may thus determine that one trunk with UDI capability and/or one trunk with RDI capability are available. Since the terminal equipment 14 may request either UDI or RDI, four possible cases exist and are illustrated in Table 2 below.

TABLE 2

Coding of Mobile Requested Bearer Services

| Case Number | Mobile Requested Bearer Capability | Transfer Capability of Trunk 28 | ISUP USI CODING |
|---|---|---|---|
| 1 | ITU V.120 UDI | Unrestricted 64 kbps transfer capability | Coding Alternative 3 |
| 2 | ITU V.120 UDI | Restricted 64 kbps transfer capability | Coding Alternative 2 |
| 3 | ITU V.120 RDI | Unrestricted 64 kbps transfer capability | Coding Alternative 2 |
| 4 | ITU V.120 RDI | Restricted 64 kbps transfer capability | Coding Alternative 1 |

If it is determined that RDI was requested in step 112, the MSSC 12 attempts to seize a trunk with RDI transfer capability in step 114 and determines if a restricted 64 kbps trunk has been allocated (step 116). If such an RDI trunk is available, in step 116, the MSSC 12 seizes the trunk 28 for the call and maps the request to an ITU V.120 call set-up request using coding alternative 1, as shown in step 118. (This situation corresponds to case 4 in Table 2). Coding alternative 1 is illustrated in Table 3 and has two parts, information element fields for ISDN Bearer Capabilities (Table 3a) and for lower layer compatibility (Table 3b). The values for the information element fields for the lower layer compatibility are determined from information transmitted in the call set-up request from the terminal equipment 14. The values for the information element fields for ISDN Bearer Capabilities are determined by the IWF 32 using that information.

TABLE 3a

Information Element Fields for the ISDN-UP

| Octet | Information Element Field | Field Value |
|---|---|---|
| 3 | Coding Standard | CCITT Standard |
|   | Information Transfer Capability | Coding RDI |
| 4 | Transfer Mode | circuit mode |
|   | Information Transfer Rate | 64 kbit/s |

TABLE 3b

Information Element Fields for Lower Layer Compatibility

| Octet | Information Element Field | Field Value |
|---|---|---|
| 3 | Coding Standard | CCITT Standard |
|   | Information Transfer Capability | Coding RDI |
| 4 | Transfer Mode | circuit mode |
|   | Information Transfer Rate | 64 kbit/s |
| 5 | User Information Layer 1 Protocol | ISDN V. 120 |
| 5a | Synchronous/asynchronous Negotiation User Rate | *Set according to user protocols Type of negotiation *Set according to user protocols |

As seen in Tables 3a and 3b, the information transfer capability for both the lower and higher layers has a value of RDI and the information transfer rate has a value of 64 kbps in the ITU V.120 call set-up request, since the requested trunk 28 has only restricted transfer capability.

Referring back to FIG. 4, if a trunk with RDI transfer capability is requested in step 114, but the MSSC 12 determines that no RDI trunks are available in step 116, the MSSC 12 may try to seize a trunk with unrestricted UDI transfer capability (step 122). If a UDI trunk is not available (step 124), the call will be rejected as shown in step 126. The MSSC 12 then transmits a signal to the terminal equipment 14 indicating that the call could not be completed. The MSSC 12 may specify an error code or message within the signal to the terminal equipment to indicate the reason for the call rejection.

If a UDI trunk is available in step 124, the IWF maps the request to an ITU V.120 call set-up message in accordance with coding alternative 2, as shown in step 128. (This situation corresponds to case 3 in Table 2.) Coding alternative 2 has two parts, information element fields for ISDN Bearer Capabilities (Table 4a) and for lower layer compatibility (Table 4b). The values for the information element fields for the lower layer compatibility are determined from information transmitted in the call set-up message from the terminal equipment 14. The values for the information element fields for the ISDN Bearer Capabilities are determined by the MSSC 12 from that information.

TABLE 4a

Information Element Fields for the ISDN-UP

| Octet | Information Element Field | Field Value |
|---|---|---|
| 3 | Coding Standard | CCITT Standard Coding |
|   | Information Transfer Capability | UDI |
| 4 | Transfer Mode | circuit mode |
|   | Information Transfer Rate | 64 kbit/s |
| 5 | User Information Layer 1 Protocol | CCITT V. 110 and X.30 |
|   | Synchronous/Asynchronous Negotiation | synchronous not possible |
|   | User Rate | 56 kbps |

TABLE 4b

Information Element Fields for Lower Layer Compatibility

| Octet | Information Element Field | Field Value |
|---|---|---|
| 3 | Coding Standard | CCITT Standard Coding |
|   | Information Transfer Capability | RDI |
| 4 | Transfer Mode | circuit mode |
|   | Information Transfer Rate | 64 kbit/s |
| 5 | User Information Layer 1 Protocol | ISDN V. 120 |
| 5a | Synchronous/asynchronous Negotiation | *Set according to user protocols |
|   | User Rate | Type of negotiation *Set according to user protocols |

In coding alternative 2, the information transfer capability in the ISDN Bearer Capability has a value of UDI, while the value in the Lower Layer Capabilities Information Elements is RDI. The information transfer rate has a value of 64 kbps. The user rate is set to 56 kbps in octet 5 in ISDN BC of the signaling message.

Coding alternative 2 is also necessary when the called party is located in a network that does not have RDI transfer capability available, i.e., the local exchange carrier 38 for the called party will reject a request for RDI service or the access signaling does not support the RDI value of the Information Transfer Capability.

If an error message is received by the MSSC 12/IWF 32 in response to the set-up request for bearer service, the MSSC 12 may elect to try an alternate coding of the call set-up message. For example, if an error message is received in response to coding alternative 1, the MSSC 12 may attempt to map the call set-up request in accordance with coding alternative 2. Likewise, if an error message is received in response to coding alternative 2, the MSSC 12 may attempt to map the call set-up request in accordance with coding alternative 1.

Referring back to step 112, if the terminal equipment 14 requests UDI transfer capability, the MSSC 12 attempts to seize a trunk 28 with unrestricted transfer capability (step 130). If the trunk 28 with UDI transfer capability (case 1 in Table 2) is available (step 132), the IWF 32 maps the ISDN V.120 message in accordance with coding alternative 3, as shown in step 134. Coding alternative 3 is shown in Tables 5a and 5b below.

TABLE 5a

Information Element Fields for the ISDN-UP

| Octet | Information Element Field | Field Value |
|---|---|---|
| 3 | Coding Standard | CCITT Standard Coding |
|   | Information Transfer Capability | UDI |

TABLE 5b

Information Element Fields for Lower Layer Compatibility

| Octet | Information Element Field | Field Value |
|---|---|---|
| 3 | Coding Standard | CCITT Standard Coding |
|   | Information Transfer Capability | UDI |
| 4 | Transfer Mode | circuit mode |
|   | Information Transfer Rate | 64 kbit/s |
| 5 | User Information Layer 1 Protocol | ITU V. 120 |
| 5a | Synchronous/asynchronous Negotiation | *Set according to user protocols |
|   | User Rate | Type, of negotiation *Set, according to user protocols |

Referring back to step 132, if the terminal equipment 14 requests UDI service, but the MSSC 12 determines that a trunk 28 with unrestricted transfer capability is not available in step 132 (case 3 in Table 2), then the MSSC 12 will determine whether the value for the user rate designated in the call set-up request from the terminal equipment 14 is 48 kbps or less (step 136). If not, an error message is generated to the terminal equipment 14 and the call is rejected, as shown in step 146.

If the user rate is less than or equal to 48 kbps in step 136, then the MSSC 12 will attempt to seize a trunk with RDI transfer capability (step 138). If such a trunk is available in step 140, the MSSC 12 will map the call set-up request in accordance with coding alternative 2, as shown in step 142. If not, an error message is generated to the terminal equipment 14 and the call is rejected, as shown in step 144.

If an error message is received in response to a set-up message when UDI service was requested, the terminal equipment 14 may elect to request RDI service instead. Typically, if the error is due to trunk capability, the error message will have the cause code #70 'only restricted digital information bearer capability is available'. The terminal equipment 14 may be programmed to attempt to request the call with RDI service when it receives a cause code #70, or to request the call with RDI service when it receives any type of error message. The terminal equipment 14 may then elect to request RDI service.

The present invention provides for alternative codings when either UDI or RDI service is requested depending on the transfer capability of trunk 28. The transfer capabilities of the available trunks are determined by the MSSC 12, and the call set-up request mapped using the appropriate coding alternative. Thus, the present invention increases the likelihood that a call set-up request will be accepted by the PSTN network 26 and terminal equipment 42. In conventional GSM wireless communications systems, the European PLMNs are connected to trunks 28 with UDI transfer capability and thus have no need to determine the transfer capability of the connected trunk. By determining the available transfer capability of the connected trunks and coding the call set-up request in response thereto, the present invention provides interfacing to other networks with different trunk capabilities.

The present invention has a particular advantage of supporting interworking between GSM V.110' and ISDN V.120 when the trunks connecting the ISDN network provide either RDI or UDI transfer capabilities. The MSSC 12/IWF 32 of the GSM wireless communications system 8 (or other interfacing wireless communications network) determines the available trunks and the transfer capability of the available trunks to the PSTN network. Depending on this determination and the requested service, the MSSC 12/IWF 32 maps the requested bearer services to different code alternatives. This mapping increases the chances of call establishment to the destination.

In conventional methods, the GSM network of European PLMN services providers were always connected to trunks with UDI transfer capability, and thus had no reason to determine the transfer capabilities of the connected trunk. Thus, only the mapping technique was provided for either RDI or UDI requested services by the terminal equipment.

As GSM/PCS 1900 networks or other wireless communications networks expand into the North American market, interfacing with the ISDN V.120 network standard and trunks with restricted transfer capability will be required. The present invention allows for the same equipment, such as the MSSC/IWF, to be used in either the European market with standard 64 kbps transfer capability or North American market with a mix of unrestricted and restricted 64 kbps trunk capabilities.

In another embodiment, the present invention may be implemented to facilitate the interworking between the two ITU standards V.110 and V.120. The present invention may be used to map message between an ISDN network operating in accordance with ITU standard V.110 and another ISDN network operating in accordance with ITU standard V.120.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. A wireless communications system connected to a digital network through a plurality of trunks, the plurality of trunks having a first transfer capability and a second transfer capability, said system comprising:
   a message center for receiving a call set-up message including a request for a call connection in accordance with one of said first and second transfer capabilities; and
   an interface unit for determining the availability of the plurality of trunks having said first and second transfer capabilities, respectively, and mapping messages between said wireless communication system and the digital network in response to said trunk availability and said request for the call connection in the call request message;
   terminal equipment;
   a base station system for communicating with the terminal equipment over an air interface;
   wherein said message center is connected to the base station system and the digital network, and wherein said message center includes the interface unit;
   wherein the terminal equipment transmits the call set-up message and request for the call connection; and
   wherein the first transfer capability is unrestricted transfer capability and the second transfer capability is restricted transfer capability.

2. The wireless communications system of claim 1, wherein the interface unit maps the call set-up message to a first coding alternative in response to determining that an available trunk has a restricted transfer capability and a request by the terminal equipment for restricted transfer capability.

3. The wireless communications system of claim 1, wherein the interface unit maps the call set-up message to a second coding alternative in response to determining that an available trunk has a restricted transfer capability and a request by the terminal equipment for unrestricted transfer capability.

4. The wireless communications system of claim 1, wherein the interface unit, in response to an error message for a first coding alternative, maps the call set-up message to a second coding alternative.

5. The wireless communications system of claim 1, further comprising a second terminal equipment connected to the digital network; and
   wherein said interface unit receives a request for call establishment from the second terminal equipment through said digital network.

6. The wireless communications system of claim 5, wherein the interface unit maps the request for a call establishment in response to the availability of the plurality of trunks having the first and second transfer capabilities and the respective transfer capability requested by the second terminal equipment.

7. The wireless communications system of claim 5 wherein the interface unit rejects a request for call establishment in response to determining that the available trunks have restricted transfer capability and the request for call establishment includes a request for unrestricted transfer capability.

8. The wireless communications system of claim 5, wherein the interface unit, in response to an error message for a first coding alternative, maps the call set-up message to a second coding alternative.

9. A method of interworking between a wireless communications system and a digital network, the wireless communications system and the digital network being connected by one or more trunks, said method comprising the steps of:
   receiving a call set-up message requesting data communications services through said digital network;
   determining the available trunks and respective transfer capabilities of the available trunks;
   mapping the call set-up message to a call request message for the digital network pursuant to the respective transfer capability of a particular available trunk; and
   determining whether the call set-up message requests unrestricted digital information (UDI) transfer or restricted digital information (RDI) transfer.

10. The method of claim 9, further comprising the step of determining whether the call set-up message requests unrestricted digital information (UDI) transfer or restricted digital information (RDI) transfer.

11. The method of claim 9, wherein the step of determining the available trunks and respective transfer capabilities of the available trunks comprises the step of:
   determining the transfer capability of said particular available trunk.

12. The method of claim 11, wherein the step of mapping the call set-up message, comprises the step of:

mapping the call set-up message to a first coding alternative in response to determining that the available trunks have RDI capability and determining that the call set-up message requests restricted RDI transfer capability.

13. The method of claim 12, wherein the step of mapping the call set-up message, further comprises the step of:

mapping the call set-up message to a second coding alternative in response to determining that the available trunks have RDI transfer capability, and a request by the terminal equipment for UDI transfer capability if a user rate requested by the terminal equipment is less than a predetermined rate.

14. The method of claim 13, wherein the step of mapping the call set-up message, further comprises:

mapping the message to the second coding alternative in response to determining that the available trunks have UDI transfer capability and a request by the terminal equipment for RDI transfer capability; and mapping the message to a third coding alternative in response to determining that the available trunks have UDI transfer capability and a request by the terminal equipment for UDI transfer capability.

15. The method of claim 14, further comprising the step of:

transmitting an error message to the terminal equipment rejecting the call set-up message in response to determining that the available trunks have RDI transfer capability and a request by the terminal equipment for UDI transfer capability.

16. The method of claim 15, further comprising the step of:

transmitting by the terminal equipment a second call set-up message requesting data communications services having RDI transfer capability in response to receiving the error message.

17. A wireless communications system, comprising:

a base service station;

at least one terminal equipment that interfaces with said base service station, said terminal equipment transmitting a request for data communication services over a digital network to said base service station; and a message service center connected to said base service station and interfaces with a digital network over one or more trunks, said message service center having an interworking function that determines the transfer capability of the available trunks and maps the request for data communication services to a message format in response to the transfer capability of said trunks, a first transfer capability of said trunks being an unrestricted transfer capability and a second transfer capability being a restricted transfer capability.

* * * * *